US011036196B2

(12) United States Patent
Salerno et al.

(10) Patent No.: US 11,036,196 B2
(45) Date of Patent: Jun. 15, 2021

(54) WEATHER-PREDICTIVE APPARATUS AND SYSTEM THEREOF FOR CONTROLLING A CLIMATIZATION PLANT

(71) Applicants: Raffaele Salerno, Turin (IT); Roberto Salimbeni, Modena (IT); Sergio Sandro Andrea Alabiso, Milan (IT); Alberto Lodi, Milan (IT)

(72) Inventors: Raffaele Salerno, Turin (IT); Roberto Salimbeni, Modena (IT); Sergio Sandro Andrea Alabiso, Milan (IT); Alberto Lodi, Milan (IT)

( * ) Notice: Subject to any disclaimer, the term of this patent is extended or adjusted under 35 U.S.C. 154(b) by 46 days.

(21) Appl. No.: 16/383,483

(22) Filed: Apr. 12, 2019

(65) Prior Publication Data

US 2019/0317460 A1    Oct. 17, 2019
US 2021/0141348 A9    May 13, 2021

(30) Foreign Application Priority Data

Apr. 13, 2018  (IT) .......................... 102018000004483

(51) Int. Cl.
  *G05B 13/04*  (2006.01)
  *F24F 11/65*  (2018.01)
  (Continued)

(52) U.S. Cl.
  CPC ............ *G05B 13/048* (2013.01); *F24F 11/30* (2018.01); *F24F 11/57* (2018.01); *F24F 11/58* (2018.01);
  (Continued)

(58) Field of Classification Search
  CPC .. F24F 11/30; F24F 11/46; F24F 11/57; F24F 11/58; F24F 11/62; F24F 11/63;
  (Continued)

(56) References Cited

U.S. PATENT DOCUMENTS 9,784,509 B2 * 10/2017 Al-Hallaj ................ F24T 10/15
10,451,302 B2 * 10/2019 Lewis ..................... G05B 15/02
(Continued)

FOREIGN PATENT DOCUMENTS

EP     3553571 A1 * 10/2019 .............. F24F 11/30
GB     2516582         1/2015

*Primary Examiner* — Crystal J Barnes-Bullock
(74) *Attorney, Agent, or Firm* — Workman Nydegger

(57) ABSTRACT

It is disclosed a weather-predictive apparatus for controlling a climatization plant, comprising a weather-climate data sensor associated with a building, a processing unit and a signal transceiver. The signal transceiver is configured to transmit a current measured value of the weather-climate data associated with the building to a weather forecast device and it is configured to receive from the weather forecast device a plurality of weather forecast data associated with the building in a forecast time interval. The processing unit is configured to: calculate a change in a nominal activation instant of the climatization plant of the building, calculate a modified activation instant; check whether the current instant is equal to the modified activation instant. In case wherein the current instant is equal to the modified activation instant, the processing unit is configured to generate a command signal having a value representative of the activation of the climatization plant.

9 Claims, 10 Drawing Sheets

(51) Int. Cl.
  *F24F 11/30* (2018.01)
  *F24F 11/58* (2018.01)
  *F24F 11/57* (2018.01)
  *G05B 19/048* (2006.01)
  *F24F 140/60* (2018.01)
  *F24F 140/50* (2018.01)
  *F24F 130/10* (2018.01)
  *F24F 110/12* (2018.01)

(52) U.S. Cl.
  CPC ............ *F24F 11/65* (2018.01); *G05B 19/048* (2013.01); *F24F 2110/12* (2018.01); *F24F 2130/10* (2018.01); *F24F 2140/50* (2018.01); *F24F 2140/60* (2018.01)

(58) Field of Classification Search
  CPC .... F24F 11/65; F24F 2110/10; F24F 2110/12; F24F 2130/10; G05B 13/048; G05B 15/02; G05B 19/048; G05B 2219/25168; G05B 2219/2614; G01W 1/10
  See application file for complete search history.

(56) References Cited

U.S. PATENT DOCUMENTS

| | | |
|---|---|---|
| 2016/0146497 A1 | 5/2016 | Chapman et al. |
| 2016/0187899 A1* | 6/2016 | Lee .................. F24F 11/62 236/44 C |
| 2017/0082310 A1 | 3/2017 | Keshmeshian et al. |
| 2017/0241661 A1 | 8/2017 | Erpelding et al. |
| 2018/0058710 A1 | 3/2018 | Lewis |

* cited by examiner

WEATHER-PREDICTIVE APPARATUS AND SYSTEM THEREOF FOR CONTROLLING A CLIMATIZATION PLANT

CROSS REFERENCE TO RELATED APPLICATIONS

The present application claims the benefit of Italian application number IT-102018000004483 filed on Apr. 13, 2018, the disclosure of which is incorporated herein by reference in its entirety.

BACKGROUND

Technical Field

The present disclosure relates in general to the sector of building climatization.

More in particular, the present disclosure concerns a weather-predictive apparatus and relative system that controls and modifies the operation of a climatization plant of a building using weather forecasts.

Description of the Related Art

Control devices are known for the activation/deactivation of climatization regulation plants in buildings of the industrial, public or domestic type; examples of plants are thermal power stations, refrigeration systems, HVAC systems, air conditioners, heat pumps.

One example of said control devices is the thermostat placed inside homes or offices, having the function of maintaining the internal temperature close to a defined temperature value (for example equal to 20° C.), by means of monitoring the internal temperature values and possibly also the external temperature of the home or office.

The programmable thermostats also have the function of regulating the internal temperature of the building according to different time intervals (e.g. it is possible to set a different internal temperature value for every hour), by means of controlling the activation/deactivation of the climatization plant.

Another example of said control devices are electromechanical clocks, which allow the activation or deactivation of a climatization plant at predetermined times; for example in a building used as an office, they allow the activation of the plant at 5:00 and its deactivation at 19:00 every day.

Control devices are known for the activation/deactivation of climatization plants of a building which consider (in addition to the building's internal temperature value and possibly its external temperature value) the past behaviour of the building, such as for example, the days/hours when the building is occupied by people and those in which it is not.

Control devices are also known for the activation/deactivation of climatization plants of a building that consider historical data relating to past climate conditions of the area where the building is located.

The Applicant has observed that a disadvantage of the known control devices for the activation/deactivation of climatization plants is that they are not able to optimize the operating dynamics of the plants themselves, thus causing a delay in the activation or deactivation of the climatization plant: said delay leads to a waste of the electricity and fuel consumed for the operation of the climatization plants, wherein said waste is increased by the common phenomena of hunting in the activation/deactivation of the plant.

These defects in control devices consequently increase air pollution.

BRIEF SUMMARY

The present disclosure relates to a dynamic weather-predictive apparatus for controlling a climatization plant for example of a building as defined in the enclosed claim 1 and the preferred embodiments thereof described in dependent claims 2 to 5.

The basic idea is to manage a weather-energy forecast which uses data representative of weather forecasts in the short term (typically around 8-24-36 hours), to bidirectionally exchange weather-climate data and predictive weather data associated with the building (for example, its external temperature), continuously updating said weather-energy forecast (dynamic thermal profile) in the short term and periodically recalculating the instants of activation/deactivation of the building's climatization plant within the same short term, and modifying the operation of the climatization plant as a function of the continuously updated weather-energy forecast.

One embodiment of the present disclosure relates to a weather-predictive system for continuously controlling a climatization plant for example of a building, wherein the system is defined in the enclosed claim 6 and the preferred embodiment thereof described in dependent claim 7.

One embodiment of the present disclosure relates to a method for the continuous weather-predictive control of a climatization plant for example of a building, wherein the method is defined in enclosed claim 8 and the preferred embodiment thereof described in dependent claim 9.

The Applicant has perceived that the weather-predictive apparatus, the weather-predictive system and the control method according to the present disclosure optimize the operating dynamics of climatization plants as they perform a synchronized control with the evolution of weather phenomena, minimizing the time interval in which the climatization plant is in operation: in this way the consumption of electricity and fuel is reduced and at the same time a condition of well-being and comfort for users within the building is maintained.

Moreover, the weather-predictive apparatus, the weather-predictive system and the control method according to the present disclosure further have the advantage of not requiring the use of at least a part of the hysteresis levels, thus reducing the reaction time of the climatization plant.

Moreover, the weather-predictive apparatus, the weather-predictive system and the control method according to the present disclosure allow to obtain a trend of the internal temperature of the air-conditioned environment which is more steady (i.e. the presence of spikes is reduced), thus increasing the comfort of people inside the building.

One embodiment of the present disclosure relates to a non-transitory computer readable medium having a program recorded thereon, said computer readable medium comprising software code means adapted to perform the steps d), g)-k) and g1)-k1) of the method according to claims 8-9, when said program is run on at least one computer.

BRIEF DESCRIPTION OF THE SEVERAL VIEWS OF THE DRAWINGS

Additional features and advantages of the disclosure will become more apparent from the description which follows of a preferred embodiment and the variants thereof, provided by way of example with reference to the appended drawings, in which.

DETAILED DESCRIPTION

It should be observed that in the following description, identical or analogous blocks, components or modules are indicated in the figures with the same numerical references, even where they are illustrated in different embodiments of the disclosure.

Figure 1:
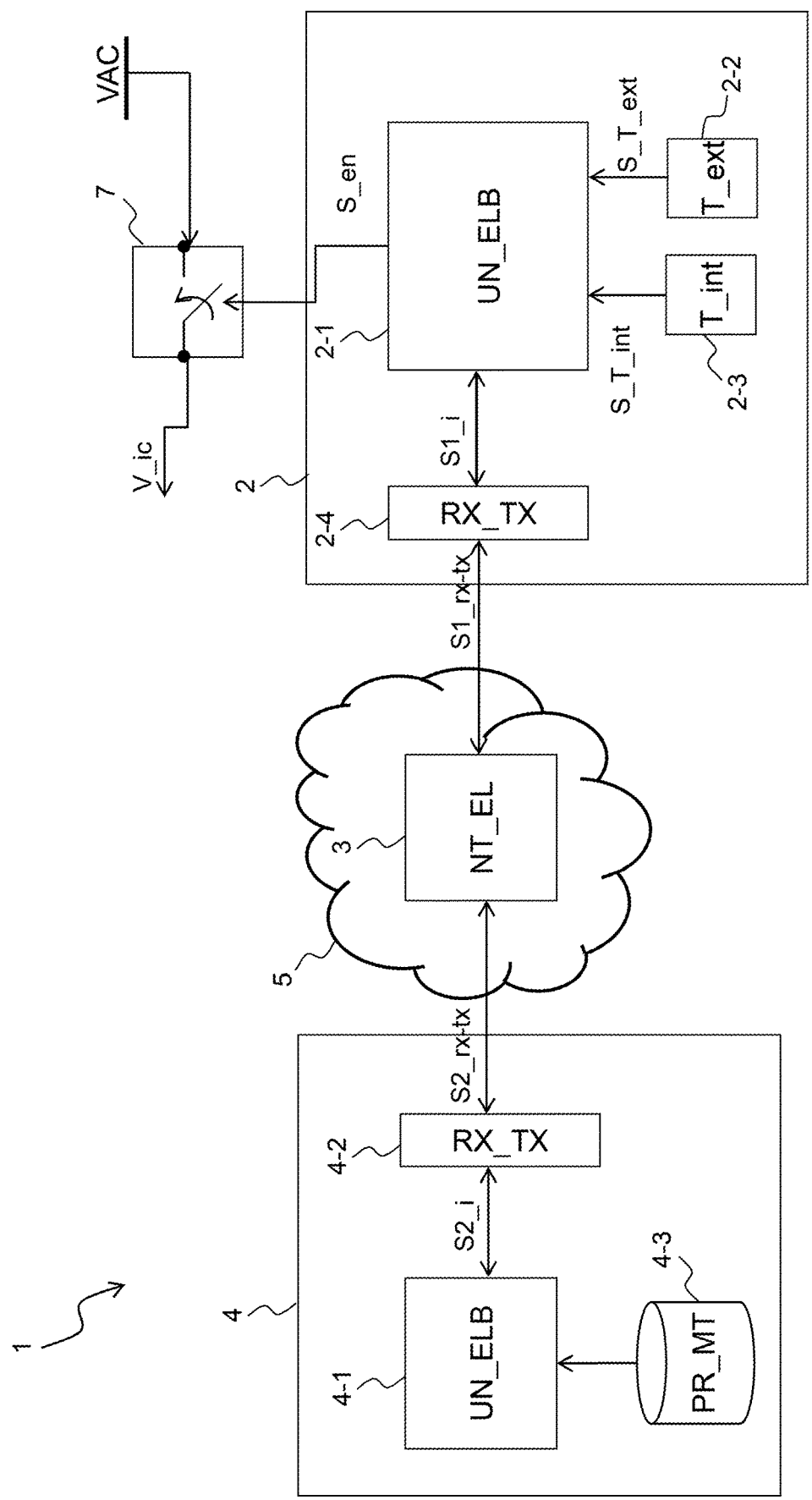
FIG. 1 shows a block diagram of a weather-predictive system for controlling a climatization plant of a building according to the disclosure.

With reference to FIG. 1, a weather-predictive system 1 is shown for continuously controlling a climatization plant of a building according to the disclosure.

Examples of climatization plants are central heating systems, refrigeration systems, HVAC systems, air conditioners, heat pumps, thermal plants.

The weather-predictive control system 1 uses a continuous calibration mechanism of the thermal profile that uses the current measured value of weather-climate data associated with the building, considered for cyclically recalculating (for example, every hour or every 15 minutes) the same forecast weather-climate data in a time interval At defined starting from the current instant (for example, every hour in the 8 or 24 or 36 hours following the current instant), wherein said forecast is performed by means of the weather forecast, using a physical-mathematical atmospheric model that takes into account the actual measured value of the weather-climate data associated with the building.

The term "predictive weather data associated with the building" is intended as geolocalized and continuously updated predictive weather data through the interaction between the weather-predictive system and sensors present in the plant and/or the building.

The term "thermal profile" is intended as a sequence of the weather forecast values associated with the considered building, such as the values of its external temperature.

The forecast time interval value At is chosen as a function of the time interval necessary to reach or exceed the nominal activation or deactivation instant.

The forecast time interval value At is defined at the configuration phase and is for example equal to 8 hours or 24 hours.

The length of the weather-climate forecast data recalculation cycle is a parameter that can be configured and can be for example in the order of seconds, minutes (for example, 15 minutes) or hours (for example, 1 hour).

For example, the weather-climate data associated with the building are the external temperature T_ext of the building (current or an average calculated over a given time interval) and thus the weather-predictive control system 1 cyclically recalculates (for example, with a period of an hour) the external temperature T_ext_p external to the building foreseen in the forecast time interval Δt starting from the current instant (for example, every hour during the 8 hours or 24 hours or 36 hours).

The control system 1 has the function of suitably controlling the activation and deactivation of a climatization plant of a building of the domestic, public or industrial type, minimizing the time interval in which the climatization plant is in operation, so as to reduce the consumption of electricity and fuel and at the same time maintain a comfortable condition for the users within the building.

The control system 1 comprises a weather-predictive apparatus 2, a network element 3 and a weather forecast device 4.

The network element 3 is connected on one side to the weather-predictive apparatus 2 and on the other side to the weather forecast device 4.

It should be noted that for simplicity in FIG. 1, only a single network element 3 has been shown, but more in general the network element 3 belongs to a telecommunications network 5 that comprises a plurality of network elements having the function of interconnecting each other the weather-predictive apparatus 2 and the weather forecast device 4.

The telecommunications network 5 can be of medium-long distance type or short distance type.

The medium-long distance type telecommunications network 5 can be of the radio-mobile type (for example, the 2G, 3G, 4G type or subsequent), or mixed fixed-radiomobile type.

The short distance telecommunications network 5 can be of the wireless type, such as WiFi or Bluetooth.

The weather forecast device 4 has the function of continuously calculating the predictive weather data forecast in the short term and associated with the considered building in the area wherein it is located; for example, the weather forecast device 4 periodically calculates every hour (or every 15 minutes) the temperature external to the building foreseen in the 8 or 24 or 36 hours after the current instant.

The weather forecast device 4 is for example a computer server, or a set of two or more computer servers connected to each other.

The use of a separate weather forecast device 4 (from the weather-predictive apparatus 2) for the calculation of the weather forecasts has the advantage of concentrating the complex calculation needed to obtain the weather forecasts in one point; furthermore, the use of the separate weather forecast device 4 has the advantage of concentrating complex algorithms of the atmospheric model used for the calculation of these weather forecasts in one point.

The weather forecast device 4 comprises a processing unit 4-1, a signal transceiver 4-2 and a database 4-3.

The processing unit 4-1 is for example a microprocessor, an electrically programmable logic device, a FPGA (Field Programmable Gate Array) or a Application Specific Integrated Circuit (ASIC).

The signal transceiver 4-2 is configured to receive from the weather-predictive apparatus 2 the current measured value (i.e. in real time) of the weather-climate data associated with the considered building.

The transceiver 4-2 can transmit/receive signals of a fixed type (for example, Ethernet) or, alternatively, of a wireless type at a short, medium or long distance (for example, WiFi or UMTS or LTE).

The database 4-3 is configured to store data representative of the physical-mathematical model of the Earth's atmosphere, indicated hereinafter as "atmospheric model".

The term "atmospheric model" is intended as a set of non-linear mathematical equations based on the conservation laws of physics that use current weather conditions (detected on the surface of the Earth and/or by means of satellites) to calculate the weather forecast in a subsequent instant of time in certain points in the space, by solving the above equations with numerical analysis techniques.

In particular, a "time steps" procedure is carried out, according to which the current weather conditions are used to calculate, using the equations of the atmospheric model, a first weather forecast in a first short time interval (for example, around a few minutes); subsequently, the first weather forecast becomes the starting point for the equations of the atmospheric model and a second weather forecast is calculated for a second short time interval subsequent to the first time interval. This time steps calculation is repeated until the desired time instant of the weather forecast is reached.

The processing unit 4-1 is configured to calculate continuously, depending on the current measured value of the weather-climate data associated with the considered building and of the short term weather forecasts obtained by means of the atmospheric model, predictive weather data forecast in the short term associated with the building in the area where it is located.

In particular:
- at a determined time instant t0 the processing unit 4-1 generates the forecasts of the weather variables which are scaled on the areas wherein the local sensors of the considered building are placed, thus with a further scaling the forecast curves of said weather variables are reproduced on each point of interest for a future time T, wherein:
  $T = t0 + \Sigma_i t_i$,
  $i = 1 \ldots N$,
  $t_i$ are the time intervals which for simplicity are supposed to be of equal length (for example 30 minutes) and which define the future trend of the atmospheric variables, which are used for defining the activation and deactivation instant of the climatization plant and/or a modulation of the climatization plant;
- at a subsequent time instant t1 the local sensors of the considered building transmit the new measured data to the weather forecast device 4 in which the processing unit 4-1 performs the calculation as a function of the new measured data; the control system 1 thus generate the new weather forecast which then are scaled on the areas wherein the local sensors are placed, thus with a further scaling (such as at the previous step) the forecast curves are reproduced on each point of interest for a future time T, wherein $T = t1 + \Sigma_i t_i$, $i = 2 \ldots N+1$.

The new weather forecast curves are used for redefining the new activation and deactivation time instants and/or the modulation of the climatization plant, thus the process continues in the same way for each time interval $t_i$ in a continuous way.

The weather forecast is for example the forecast of the external temperature at a given point of the Earth (identified as latitude, longitude and height relative to the ground) at every hour for the 8 or 24 hours following the current instant.

Alternatively (or in combination), the weather forecasts are solar radiation, wind speed and direction, barometric pressure.

The weather-climate data associated with the considered building include one or more among the following for example:
- detected value of the temperature T_ext external to the building;
- detected value of the humidity external to the building;
- solar radiation;
- detected amount of atmospheric precipitation (rain, snow).

The signal transceiver 4-2 is further configured to receive from the processing unit 4-1 the predictive weather data forecast in the short term associated with the considered building and to transmit said predictive weather data to the weather-predictive apparatus 2, crossing the network element 3.

The weather-predictive apparatus 2 has the function of controlling the activation and deactivation of the climatization plant of the building as a function of the predictive weather data forecast in the short term.

The weather-predictive apparatus 2 comprises a processing unit 2-1, a signal transceiver 2-4, a sensor 2-2 for the external temperature T_ext of the building and in particular a sensor 2-3 of the internal temperature T_int of the building.

The processing unit 2-1 is for example a microprocessor, an electrically programmable logic device, a FPGA (Field Programmable Gate Array) or a Application Specific Integrated Circuit (ASIC).

The external temperature sensor 2-2 is configured to generate a signal S_T_ext representative of the current measured value of the temperature external to the considered building.

It should be noted that for simplicity an external temperature sensor of the building is considered, but alternatively (or in combination) it is possible to use other weather-climate and environmental data sensors associated with the building, such as an external humidity sensor, wind speed sensor, solar radiation sensor, rainfall sensor of atmospheric precipitation.

The signal transceiver 2-4 is configured to transmit towards the weather forecast device 4 the current value (i.e. in real time) of the measured weather-climate data associated with the considered building, wherein said weather-climate data are for example the detected value of the external temperature T_ext of the building detected by the external temperature sensor 2-2, the detected value of the internal temperature T_int of the building detected by the internal temperature sensor 2-3, or weather-climate data detected by other sensors such as external humidity, wind speed, solar radiation, etc.

The signal transceiver 2-4 is further configured to receive from the network element 3 data representative of the weather forecasts in the short term in the area wherein the specific building is located, then said short term weather forecast data are forwarded to the processing unit 2-1.

The transceiver 2-4 can transmit/receive signals of a fixed type (for example, Ethernet) or, alternatively, of a wireless type at a short, medium or long distance (for example, WiFi or UMTS or LTE).

The processing unit 2-1 of the weather-predictive apparatus 2 is configured to receive from the sensor 2-2 the signal representative of the current measured value of the external temperature T_ext of the building, is configured to receive from the transceiver 2-4 the predictive weather data forecast in the short term associated with the considered building, and is configured to generate, as a function of the current measured value of the weather-climate data associated with the building and at least part of the predictive weather data forecast in the short term, a change in a nominal activation instant and/or a change in a nominal deactivation instant of the climatization plant of the building.

According to a first variant of the disclosure, the processing unit 2-1 calculates said change in the nominal activation instant as a function of a plurality of predictive weather data values that comprise all the values up to the comprised nominal activation instant; furthermore, the processing unit 2-1 calculates said change in the nominal deactivation instant as a function of a plurality of predictive weather data values at instants which comprise all the values up to the comprised nominal deactivation instant.

According to a second variant of the disclosure, the processing unit 2-1 calculates said change in the nominal activation instant as a function of a plurality of predictive weather data values at instants which are both before the nominal activation instant and after the nominal activation instant; the processing unit 2-1 also calculates said change in the nominal deactivation instant as a function of a plurality of predictive weather data values at instants that are both before the nominal deactivation instant and after the nominal deactivation instant.

For example, in the second variant the nominal activation instant is fixed at 6:00, the weather-climate data and predictive weather data (for example, the external temperature of the building) have a granularity of 1 hour and at the current instant it is 23:00. In this example, the value of the forecast time interval At is chosen as equal to 12 hours and thus 12 predictive weather data values are received at the instants 24:00, 1:00, 2:00, 3:00, 4:00, 5:00, 6:00, 7:00, 8:00, 9:00, 10:00, 11:00. At 23:00 the change in the nominal activation instant is calculated taking into account both the predictive weather data values at the instants 24:00, 1:00, 2:00, 3:00, 4:00, 5:00 which are before the nominal activation instant (6:00), and the predictive weather data values at the instants 7:00, 8:00, 9:00, 10:00, 11:00 which are after the nominal activation instant (6:00).

In particular, the processing unit 2-1 is configured to generate a suitable command signal S_en for electrically controlling the activation and deactivation of the climatization plant of the building, as will be further explained in more detail.

For example, the predictive weather data are the value of the external temperature T_ext_p foreseen in the short term (value comprised between 8 and 24 hours) in the area wherein the specific building is located.

In one embodiment said control of the activation or deactivation instant of the climatization plant of the building is carried out by means of the by-pass of the electro-mechanical clock or programmable thermostat already present in the climatization plant and by the opening or closing of a switch 7 (commonly referred to as contactor) that normally activates or deactivates the climatization plant of the building, as a function of the electrical connection between an alternating supply voltage VAC, and an internal supply voltage V_ic that supplies the climatization plant; therefore, the processing unit 2-1 is configured to generate the command signal S_en to close or open the switch 7 which respectively enables or disables the power supply to the climatization plant of the building.

The switch 7 is positioned for example in the switchboard of the climatization plant and is configured to switch, as a function of the value of the command signal S_en, between a closed position in which it is such to supply power VAC (for example, voltage and alternating current) to the climatization plant and an open position in which it is such to interrupt the power supply to the climatization plant.

Figure 4:
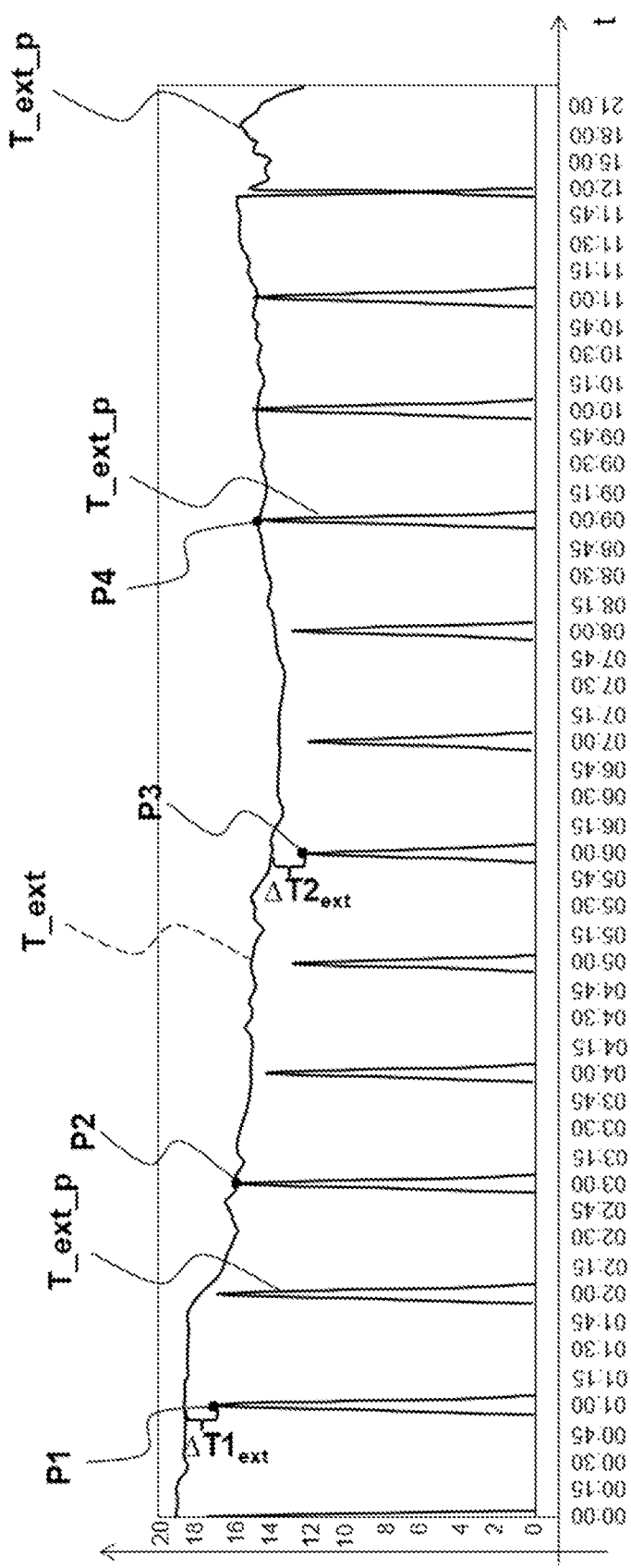
FIG. 4 schematically shows a comparison between a possible trend of the actual temperature outside a building and the predictive external temperature calculated by the weather forecast apparatus of the disclosure.

With reference to FIG. 4, a comparison is shown between a possible trend of the external temperature T_ext of a building measured on a particular day at the times comprised between 24:00 and 21:00 and a possible trend of the predictive external temperature T_ext_p foreseen in the same time interval external to the same building.

It can be noted that the predictive external temperature values T_ext_p are calculated every hour, for example at 24:00, 1:00, 2:00 . . . and so on until 12:00 and then up to 21:00.

It can also be noted that in certain time instants the value of the predictive external temperature is substantially equal to that of the measured external temperature (see, for example, points P2 and P4), while at other time instants the value of the predictive external temperature is different from that of the measured external temperature (see, for example, the points P1 and P3 which respectively differ by a value $\Delta T1_{ext}$ and $\Delta T2_{ext}$): the weather-predictive system 1 continuously acquires (in the considered example every hour) the current value of the external temperature T_ext (measured by means of the temperature sensor 2-2) and continuously recalculates (by means of the weather forecast device 4) the forecast value of the external predictive temperature T_ext_p external to the building in a plurality of instants following the current instant, as will be further explained in more detail; thus the weather-predictive system 1 continuously recalculates (in the considered example every hour), as a function of the values of the differences between the current measured temperature and the forecast temperatures, the instant of activation and deactivation of the climatization plant.

Figure 5A:
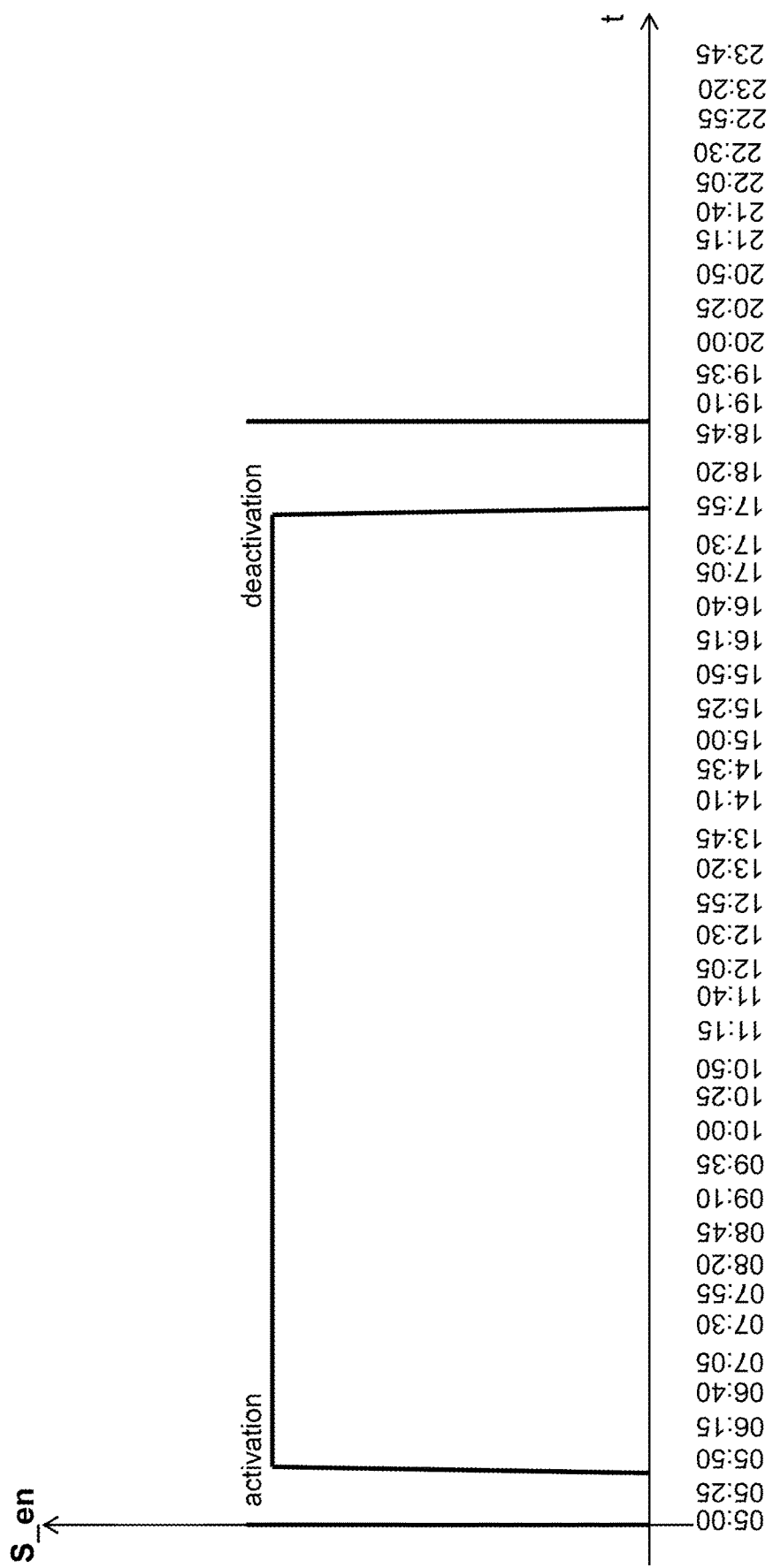
FIGS. 5A-5B schematically show a possible trend of a control signal generated by the weather-predictive apparatus for controlling the activation or deactivation of a climatization plant of a building in a one-day time interval and a four-days time interval.

With reference to FIG. 5A, a possible trend is shown of the command signal S_en generated by the weather-predictive apparatus 2 in a time interval of a day, in the case of the control of a heating plant (for example, a thermal power plant).

The case is considered wherein the nominal operating interval of the heating plant (programmed for example with an electro-mechanical clock) is comprised between 5:00 and 19:00, i.e. the heating plant should be activated at 5:00 and should be deactivated at 19:00.

It can be observed that the actual operating interval of the heating system is comprised between 5:50 and 17:55, i.e. the heating plant is actually activated at 5:50 and is actually deactivated at 17:55, by means of the weather-predictive system 1 according to the disclosure.

Therefore, the weather-predictive system 1 has postponed the activation of the heating plant from 5:00 to 5:50 (i.e. a delay of 50 minutes) and has anticipated the deactivation of the heating plant from 19:00 to 17:55 (i.e. 65 minutes early), thus reducing the operating interval of the heating plant from 14 hours to 12 hours and 5 minutes: in this way the consumption of electricity and fuel is reduced, while simultaneously maintaining comfortable conditions for users inside the building.

Figure 5B:
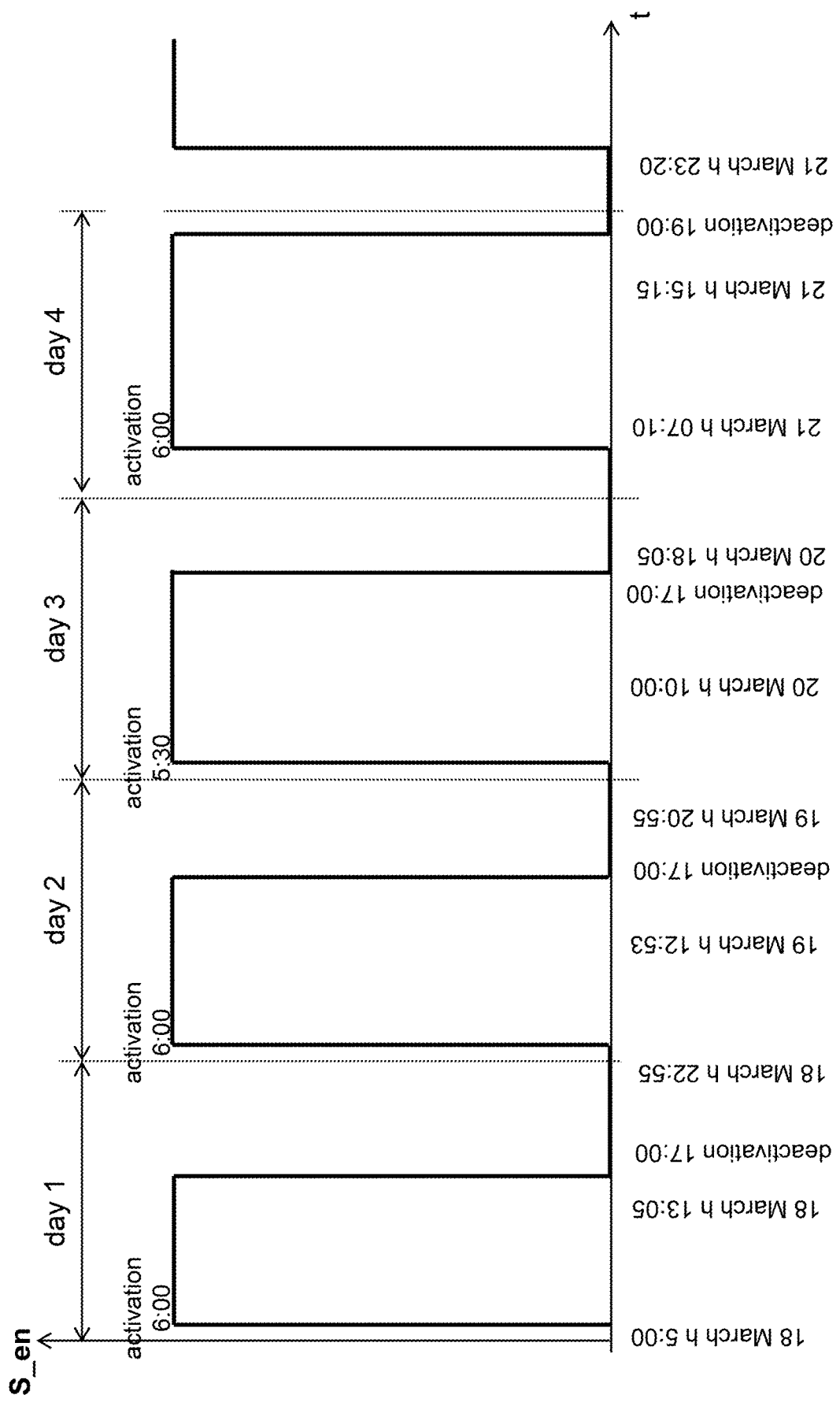

With reference to FIG. 5B, a possible trend is shown of the command signal S_en generated by the weather-predictive apparatus 2 in a time interval of four consecutive days, in the case of the control of a heating plant (for example, a thermal power plant).

The case is again considered wherein the nominal operating interval of the heating plant is comprised between 5:00 and 19:00.

It is possible to observe the following behaviour:
- during the first day the actual operating interval of the heating plant is comprised between 6:00 and 17:00, i.e. the weather-predictive system 1 has reduced the operating interval from 14 nominal hours to 11 actual hours, for example because the forecasts of the climate conditions around the building were more favourable than those actually measured;
- during the second day the actual operating interval of the heating plant is comprised between 6:00 and 17:00, similarly to the first day;
- during the third day the actual operating interval of the heating system is comprised between 5:30 and 17:00, i.e. the weather-predictive system 1 has reduced the operating interval from 14 nominal hours to 11 nominal hours and 30 actual hours, for example because the climate conditions surrounding the building were slightly less favourable than those of the first and second day;
- during the fourth day the actual operating interval of the heating plant is comprised between 6:00 and 19:00, i.e. the weather-predictive system 1 has reduced the operating interval from 14 hours to 13 hours (i.e. only by one hour), because the climate conditions surrounding the building were much less favourable than those of the first, second and third day.

Figure 2A:
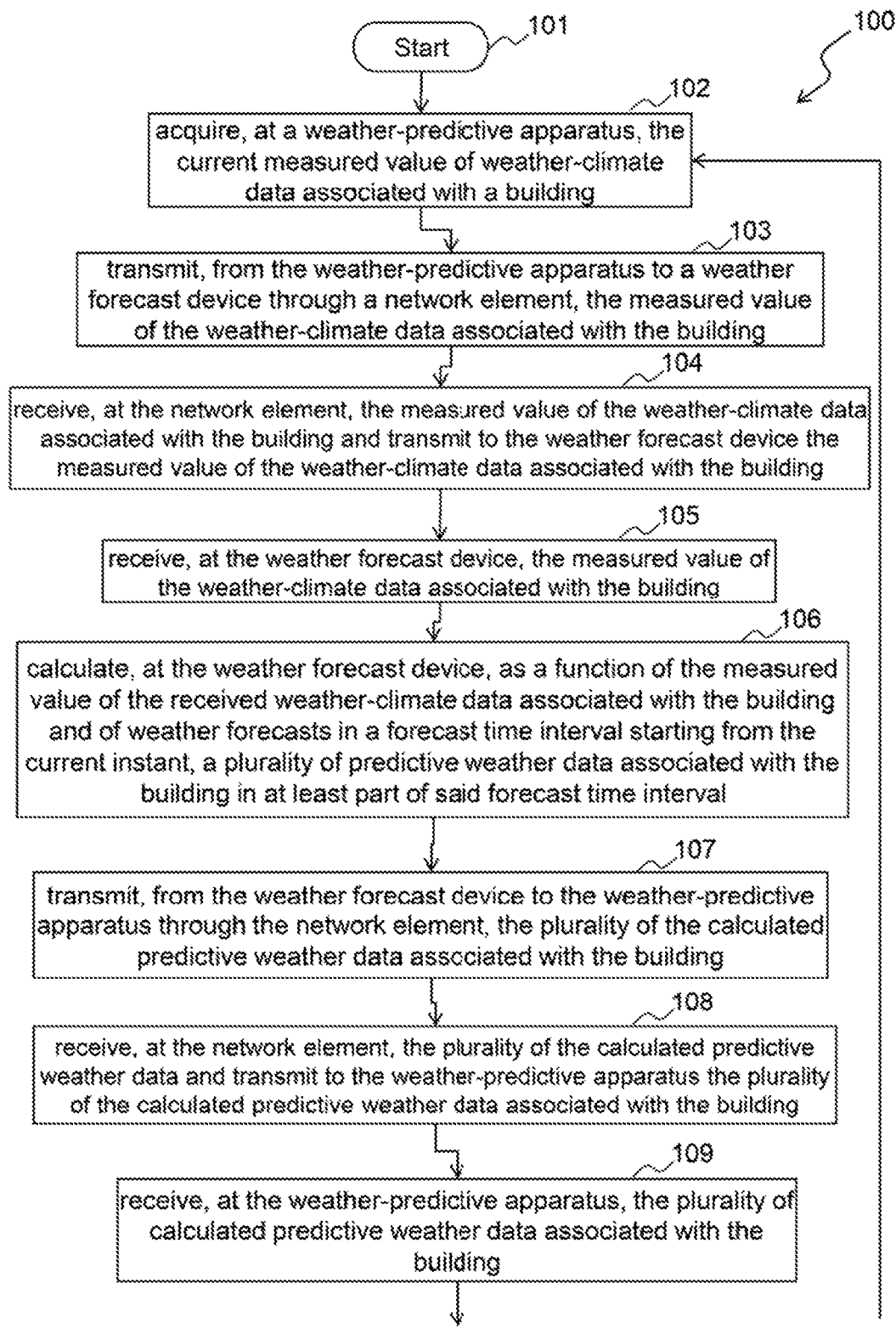
FIGS. 2A-B show the flow diagram of a method for the weather-predictive control of a climatization plant of a building according to the disclosure.
Figure 2B:
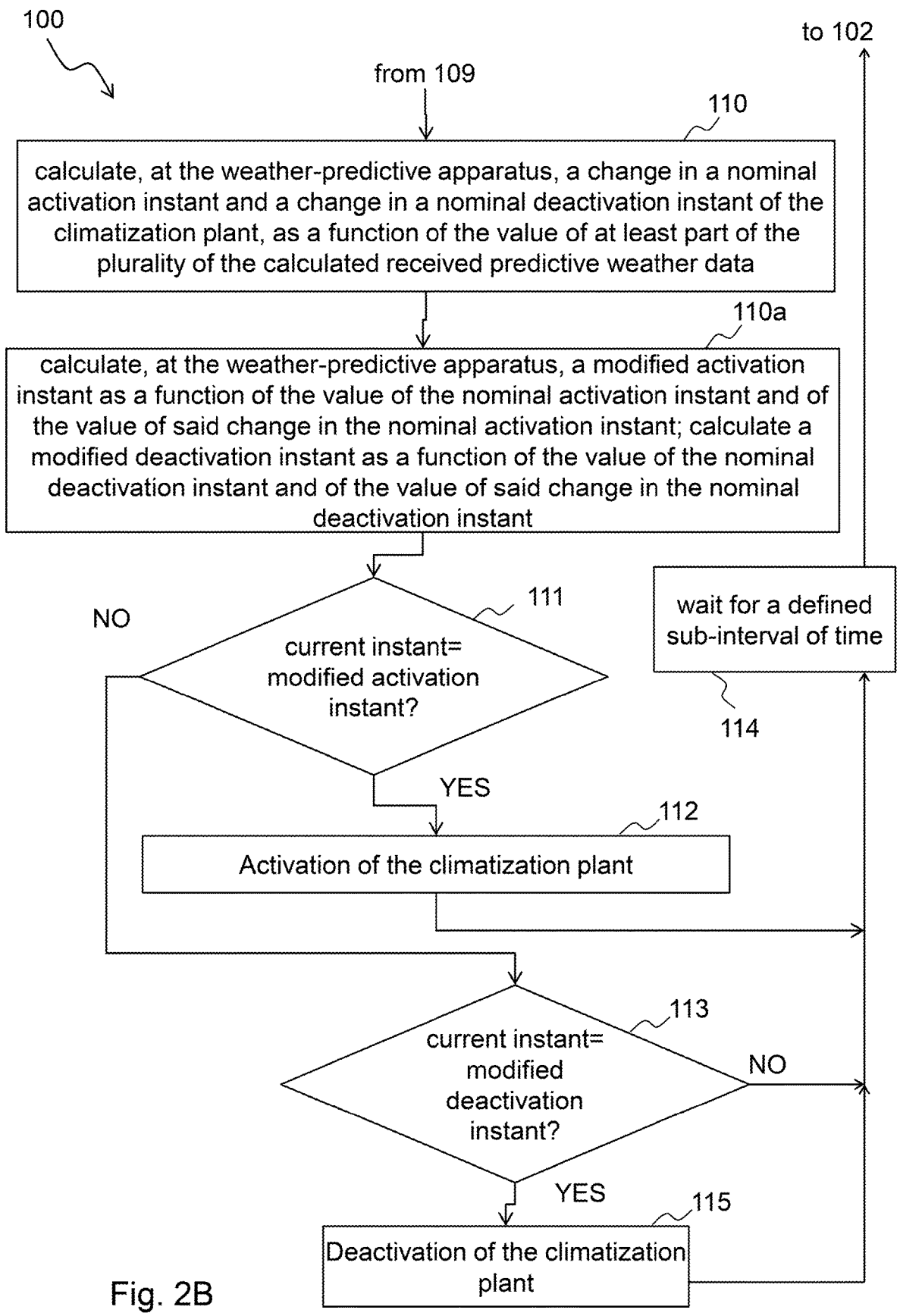

With reference to FIGS. 2A-2B, the flow diagram 100 is shown of a method for the weather-predictive control of a climatization plant of a building according to the disclosure.

The method is performed by means of the weather-predictive system 1, in particular it is performed in part by the weather-predictive apparatus 2 by means of a software program executed on the processing unit 2-1, in part by the weather forecast device 4 by means of another software program executed on the processing unit 4-1 and in part by the network element 3.

The flow diagram 100 starts with step 101.

From step 101 the cycle continues to step 102, wherein the weather-predictive apparatus 2 acquires the current measured value of one or more weather-climate data associated with the building.

For example, the weather-climate data associated with the building are the external temperature T_ext of the building detected by the temperature sensor 2-2.

From step 102 the cycle continues to step 103 wherein the weather-predictive apparatus 2 transmits to the weather forecast device 4 the measured value of the weather-climate data associated with the building through the network element 5.

From step 103 the cycle continues to step 104 wherein the network element 3 receives the measured value of the weather-climate data associated with the building, thus the network element 3 transmits to the weather forecast device 4 the measured value of the weather-climate data associated with the building.

From step 104 the cycle continues to step 105 wherein the weather forecast device 4 receives the measured value of the weather-climate data associated with the building.

From step 105 the cycle continues to step 106 wherein the weather forecast device 4 calculates a plurality (i.e. at least two) of predictive weather data associated with the building in at least part of the forecast time interval, as a function of the measured value of the received weather-climate data associated with the building and as a function of the weather forecasts in a forecast time interval defined starting from the current instant.

In one embodiment, in step 106 said plurality of predictive weather data is calculated in time instants (for example, every hour or every 15 minutes) which are both before and after the nominal activation instant and nominal deactivation instant.

For example, the nominal activation instant is at 6:00, the weather-climate data and predictive weather data (for example, the external temperature of the building) have a granularity of 1 hour and at the current instant it is 23:00. In this example, the forecast time interval At is chosen as equal to 12 hours, so that at 23:00 12 values are calculated of the predictive weather data at the instants 24:00, 1:00, 2:00, 3:00, 4:00, 5:00, 6:00, 7:00, 8:00, 9:00, 10:00, 11:00; the previous list includes both predictive weather data at the instants 24:00, 1:00, 2:00, 3:00, 4:00, 5:00 which are before the nominal activation instant (6:00), and the predictive weather data at the instants 7:00, 8:00, 9:00, 10:00, 11:00 which are after the nominal activation instant (6:00).

In one embodiment said plurality of predictive weather data is periodic, i.e. two successive values are separated by a time interval equal to a period (for example, an hour or 15 minutes).

For example, since the overall value of the forecast time interval is equal to 8 hours, the weather-climate data associated with the building are the value of its external temperature T_ext and the weather forecasts are a forecast of the temperature external to the building every hour in the 8 hours following the current instant which is supposed at 11:00 am: in step 106 a forecast is thus calculated of the external temperature T_ext of the building at 12:00, 13:00, 14:00, 15:00, 16:00, 17:00, 18:00, 19:00.

From step 106 the cycle continues to step 107 wherein the weather forecast device 4 transmits to the weather-predictive apparatus 2 through the network node 3, the plurality of calculated predictive weather data associated with the building.

From step 107 the cycle continues to step 108 wherein the network element 3 receives the plurality of calculated predictive weather data, thus the network element 3 transmits to the predictive-weather apparatus 2 the plurality of calculated predictive weather data.

From step 108 the cycle continues to step 109, wherein the weather-predictive apparatus 2 receives the plurality of calculated predictive weather data associated with the building.

From step 109 the cycle continues to step 110, wherein the weather-predictive apparatus 2 calculates a change in a nominal activation instant and a change in a nominal deactivation instant of the climatization plant of the building as a function of the value of at least part of the plurality of the calculated received predictive weather data.

It should be noted that in step 110, the calculation can take into account a plurality of predictive weather data values at instants that comprise all the values up to the nominal activation/deactivation instant; alternatively, in step 110 the calculation can consider a plurality of predictive weather data values at instants which are both before and after the nominal activation/deactivation instant.

In particular, in step 110 the value of the current activation instant of the climatization plant is calculated as a function of the difference $\Delta T_{ext}$ between the measured value at the current instant of the weather-climate data associated with the building and at least a part of the predictive weather data values before and/or after the nominal activation instant.

From step 110 the cycle continues to step 110a, wherein the weather-predictive apparatus 2 calculates a modified activation instant as a function of the value of the nominal activation instant and of the value of said change in the nominal activation instant.

For example, the nominal activation instant is 6:00, while the actual calculated activation instant is 6:30, therefore in step 110 a change (delay) of 30 minutes was calculated.

Similarly, in step 110 the value of the actual deactivation instant of the climatization plant is calculated as a function of the difference $\Delta T_{ext}$ between the measured value of the weather-climate data at the current instant associated with the building and at least a part of the predictive weather data values before and/or after the nominal activation instant.

For example, the nominal deactivation instant is 19:00, while the actual calculated deactivation instant is 18:45, therefore in step 110 a change (advance) of 15 minutes was calculated.

From step 110a the cycle continues to step 111, wherein the current instant is checked to verify if it is equal to the calculated modified activation instant:

in the affirmative case (i.e. the current instant is equal to the previously calculated activation instant), from step 111 the cycle continues to step 112, wherein the activation of the climatization plant of the building is carried out;

in the negative case (i.e. the current instant is different from the previously calculated modified activation instant), from step 111 the cycle continues to step 113.

In step 113 it is checked whether the current instant is equal to the calculated modified deactivation instant;

in the affirmative case (i.e. the current instant is equal to the previously calculated modified deactivation instant), from step 113 the cycle continues to step 115, wherein the deactivation of the climatization plant of the building is carried out;

in the negative case (i.e. the current instant is different from the previously calculated modified deactivation instant), from step 113 the cycle continues to step 114.

In step 114, the elapse of a defined sub-interval of time (for example, equal to 1 hour) is waited for and when said defined sub-interval of time has elapsed, from step 114 the cycle returns to the initial step 102.

In case wherein said calculation of the modified activation/deactivation instant is carried out periodically, the value of said sub-interval of time is the value of the calculation cycle period.

Therefore, the cycle consisting of the steps 102, 103, 104, 105, 106, 107, 108, 109, 110, 111, 113, 114 is repeated until the moment is reached wherein the instant for activating the climatization plant is calculated, or until the moment is reached wherein the instant for deactivating the climatization plant is calculated.

Figure 3A:
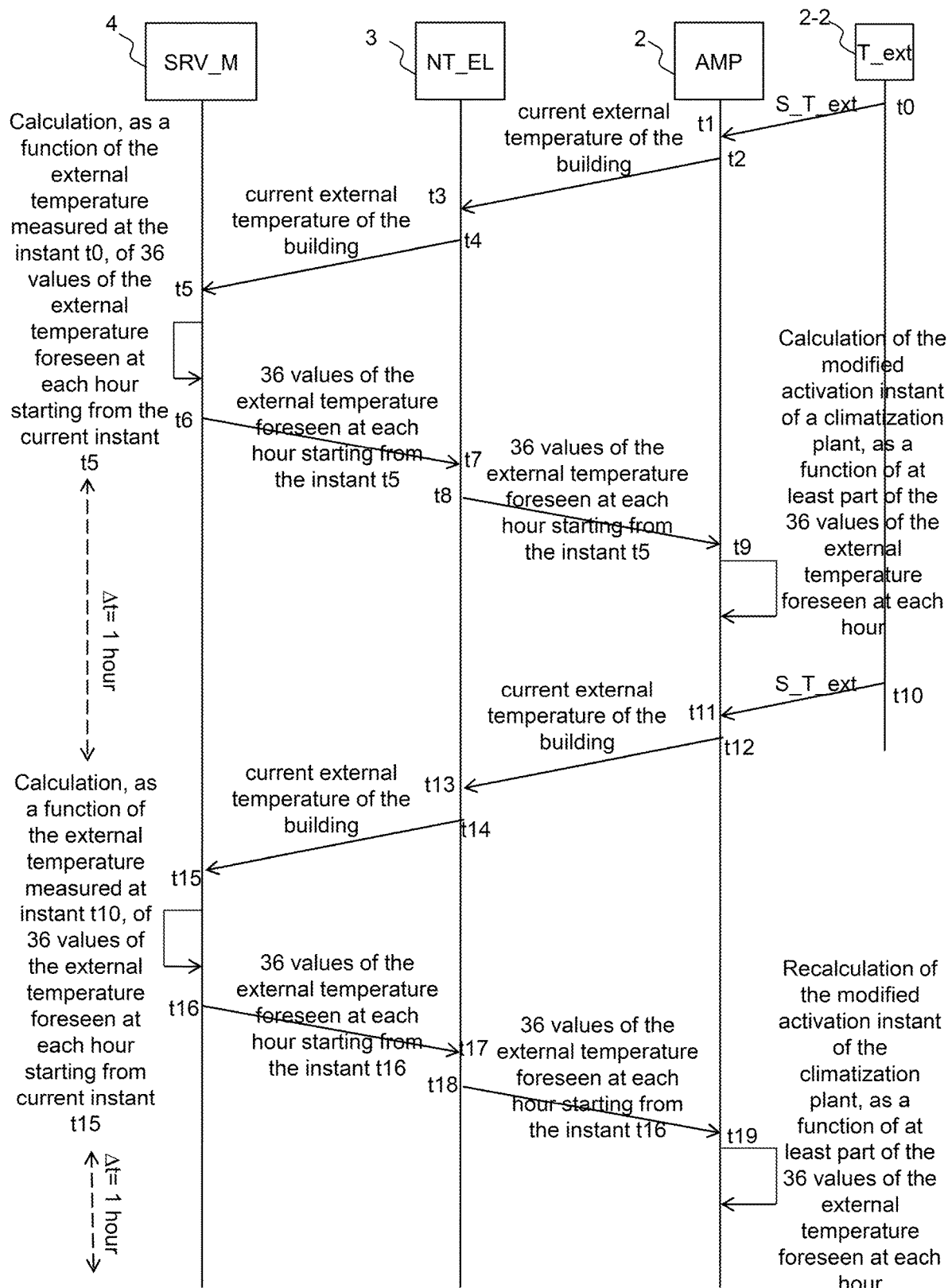
FIGS. 3A-C show the messages exchanged between a weather-predictive apparatus, a network element and a weather forecast apparatus of the weather-predictive system according to the disclosure.
Figure 3B:
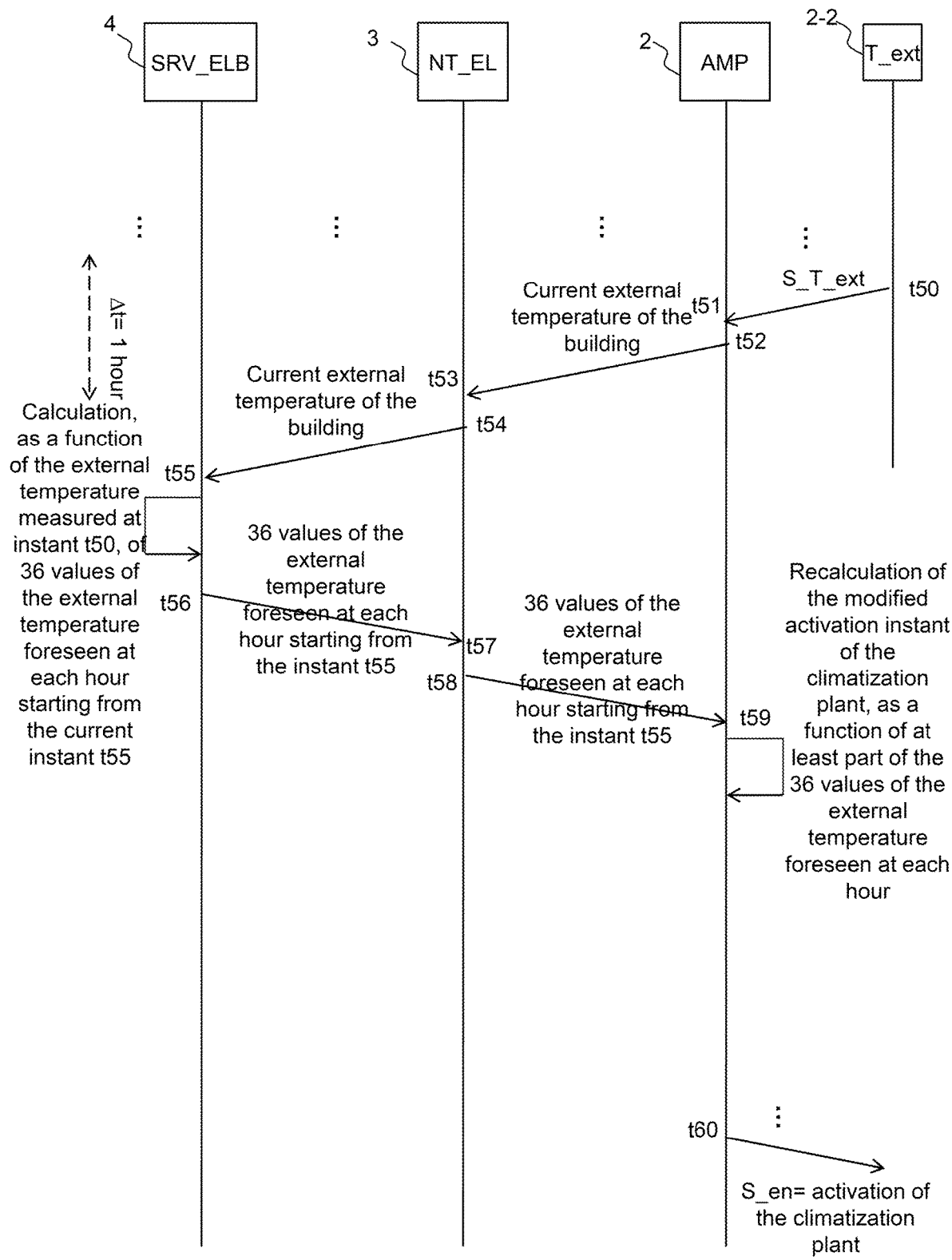
Figure 3C:
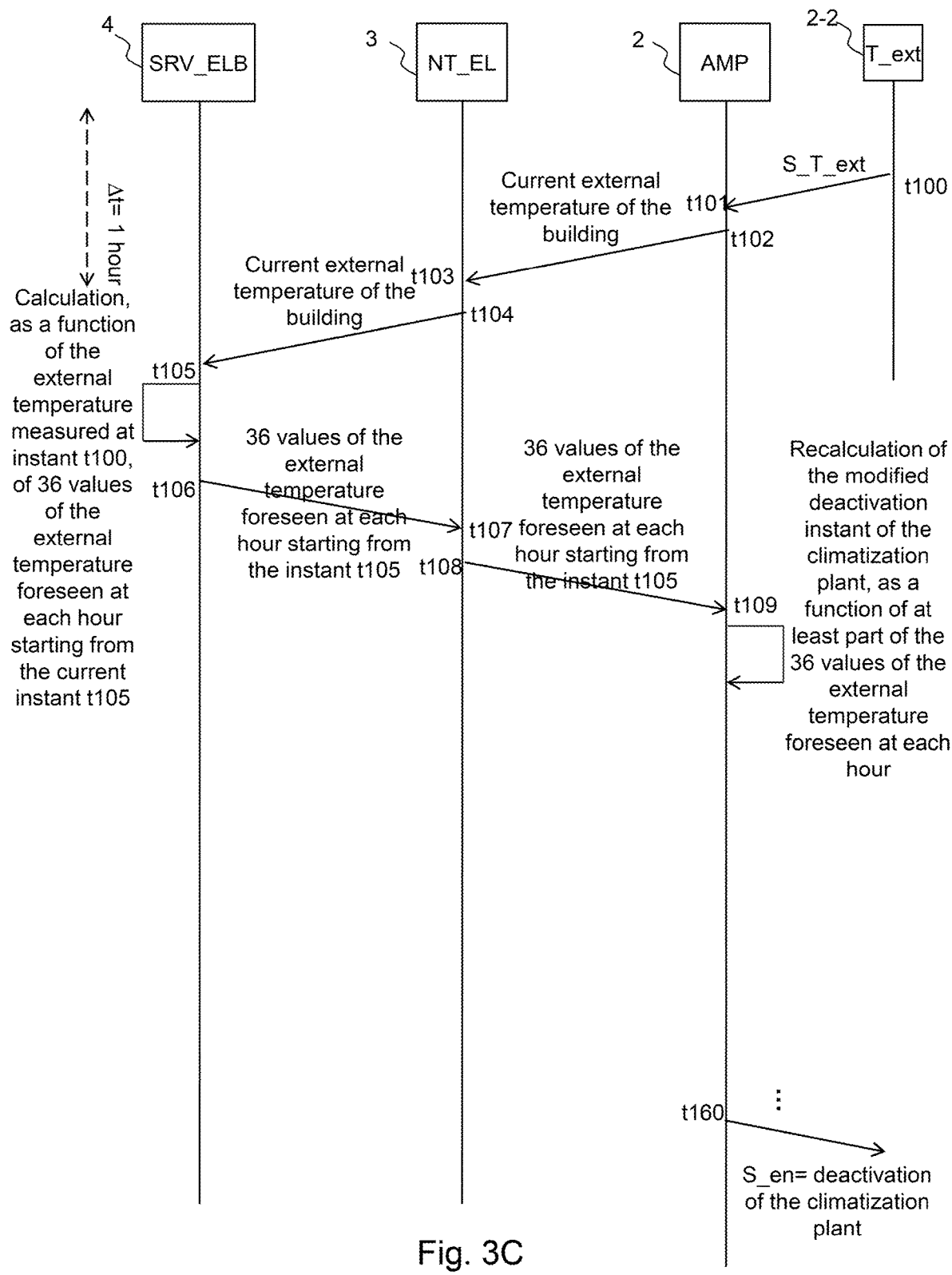

With reference to FIGS. 3A-C, the time evolution is shown of the messages exchanged between the weather-predictive apparatus 2, the network element 3 and the weather forecast device 4 according to the disclosure.

For the purposes of the explanation of the disclosure the following hypotheses are considered:

every day the climatization plant of a building will automatically activate in the morning and automatically deactivate in the evening;

the nominal activation instant of the climatization plant is 6:00;

the nominal deactivation instant of the climatization plant is 19:00;

the weather-climate data measured by the weather-predictive apparatus 2 are the measured values of the external temperature of the building;

the calculation of the climatization plant activation/deactivation instants is carried out periodically with a period equal to 1 hour;

the total forecast time interval value $\Delta t$ is equal to 36 hours and thus 36 hourly values of the external temperature of the building are calculated.

At the initial instant t0, the temperature sensor 2-2 detects the current external temperature value of the building and at the instant t2 (following t0) the weather-predictive apparatus 2 transmits to the weather forecast device 4 the current external temperature value detected.

At the instant t3 (following t2) the network element 3 receives the current detected value of the external temperature and forwards it to the weather forecast device 4.

At the instant t5 (following t3) the weather forecast device 4 receives the detected current external temperature value and calculates, as a function of the current external temperature value of the building at instant t0, 36 values of the temperature external to the building foreseen at each hour starting from the current instant t5, namely:

temperature external to the building foreseen at the instant t5+1 hour;
temperature external to the building foreseen at the instant t5+2 hours;
temperature external to the building foreseen at the instant t5+3 hours;
temperature external to the building foreseen at the instant t5+4 hours;
temperature external to the building foreseen at the instant t5+5 hours;
temperature external to the building foreseen at the instant t5+6 hours;
temperature external to the building foreseen at the instant t5+7 hours;
temperature external to the building foreseen at the instant t5+8 hours;
temperature external to the building foreseen at the instant t5+9 hours;
temperature external to the building foreseen at the instant t5+10 hours;
temperature external to the building foreseen at the instant t5+11 hours;
temperature external to the building foreseen at the instant t5+12 hours;
temperature external to the building foreseen at the instant t5+13 hours;
and so on, up to the temperature external to the building foreseen at the instant t5+36 hours.

At the instant t6 the weather forecast device 4 transmits towards the weather-predictive apparatus 2 the 36 values of the temperature external to the building foreseen at each hour starting from the instant t5.

At the instant t7 the network element 3 receives the 36 forecast external temperature values and forwards them towards the weather-predictive apparatus 2.

At the instant t9 the weather-predictive apparatus 2 receives the 36 values of the forecast external temperature and calculates a modified activation instant of the building's climatization plant, as a function of at least part of the 36 forecast external temperature values at each hour.

Therefore at the instant t9, the first calculation cycle of the activation instant of the climatization plant is completed.

At the instant t10 the second calculation cycle of the activation instant of the climatization plant begins, which is similar to the first calculation cycle and is comprised between the instant t10 and the instant t19.

Therefore at the instant t19 the weather-predictive apparatus 2 has recalculated the modified activation instant of the climatization plant of the building, which can be the same or different than the activation instant previously calculated at the instant t9.

In the instants comprised between t19 and t50 (excluded), further recalculation cycles are performed of the activation instant of the building's climatization plant.

At the instant t50 the last recalculation cycle of the activation instant begins, which ends at the instant t59 wherein the processing unit 2-1 of the weather-predictive apparatus 2 calculates that the modified activation instant of the building's climatization plant is equal to t60.

At the instant t60 the processing unit 2-1 of the weather-predictive apparatus 2 detects that the current instant is equal to the modified activation instant t60 and thus generates the command signal S_en which controls the activation of the climatization plant, by means of closing the switch 7, which electrically connects an input terminal thereof which receives the alternating supply voltage VAC with an output terminal thereof which generates the internal supply voltage V_ic that supplies power to the climatization plant, thus making it possible to supply power to the climatization plant.

It should be noted that the instant t60 wherein the activation is carried out is different (in particular after) than the nominal activation instant of 6:00; for example, the instant t60 can be the same at 6:15, or 6:30, or 6:45, or 7:00.

The operation between the instants t100 and t109 is similar to that illustrated previously between the instants t0 and t9, with the difference that at the instant t109 the modified deactivation instant is calculated (instead of the modified activation instant) of the climatization plant of the building.

Subsequently at the instant t109 further recalculation cycles are performed (not shown in FIG. 3C) of the modified deactivation instant, until the modified deactivation instant of the climatization plant of the building is calculated as equal to t160.

At the instant t160 the processing unit 2-1 of the weather-predictive apparatus 2 detects that the current instant t160 is equal to the modified activation instant t160 and thus generates the command signal S_en which controls the deactivation of the climatization plant, by means of opening the switch 7, which electrically disconnects the input terminal thereof which receives the alternating supply voltage VAC with an output terminal thereof which generates the internal supply voltage V_ic that powers the climatization plant, thus interrupting the supply to the climatization plant.

It should be noted that the instant t160 wherein the deactivation is carried out is different (in particular before) than the nominal deactivation instant at 19:00; for example, the instant t160 can be equal to 17:30, or 17:00 or 16:30 or 16:00.

Figure 6:
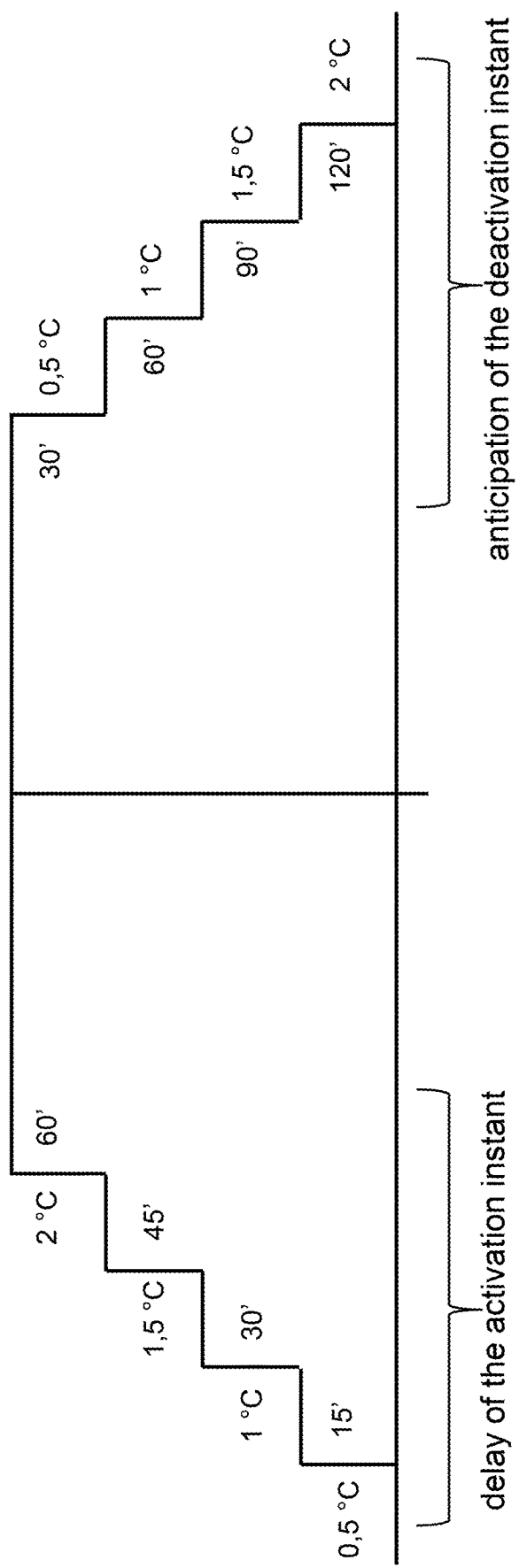
FIG. 6 shows a double stair algorithm for the calculation of the activation and deactivation instant of the climatization plant of a building.

According to a preferred embodiment, the processing unit 2-1 of the weather-predictive apparatus 2 calculates the modified activation and deactivation instant of the building's climatization plant using a double stair algorithm which considers the difference $\Delta T_{ext}$ between the current measured external temperature T_ext (or an average of the last values) and one or more values of the predictive external temperature T_ext_p foreseen in the short term outside the building, as shown in FIG. 6.

FIG. 6 comprises an activation stair positioned to the left relative to the activation instant delay (with respect to the nominal activation instant) of the climatization plant of the considered building and comprises a deactivation stair positioned to the right relative to the deactivation instant advance (with respect to the nominal deactivation instant) of the climatization plant.

The activation stair comprises four steps, each of which is composed of the following pair of values:

external temperature difference $\Delta T_{ext}$ (expressed in degrees centigrade) calculated as the difference between the current measured external temperature T_ext of the building and the predictive external temperature calculated T_ext_p external to the building in an instant of the forecast time interval;

value (for example expressed in minutes) of the activation delay of the climatization plant (compared to the nominal activation instant value) corresponding to the external temperature difference $\Delta T_{ext}$.

Therefore, when the processing unit 2-1 of the weather-predictive apparatus 2 detects a certain value $\Delta T_{ext}$ of the difference of the external temperature, the processing unit 2-1 generates the command signal S_en having a value representative of the activation delay corresponding to said determined value $\Delta T_{ext}$ of the external temperature difference.

In particular, the steps of the activation stair have the following values:

first step: external temperature difference $\Delta T_{ext}$=0.5° C., activation instant delay=15';

second step: external temperature difference $\Delta T_{ext}$=1° C., activation instant delay=30';

third step: external temperature difference $\Delta T_{ext}$=1.5° C., activation instant delay=45';

fourth step: external temperature difference $\Delta T_{ext}$=2° C., activation instant delay=60'.

It can be observed that with the increase in the value of the external temperature difference $\Delta T_{ext}$, the delay in the value of the activation instant of the climatization plant of the considered building also increases.

Considering for example the second step of the activation stair, when the processing unit 2-1 of the weather-predictive apparatus 2 detects that the value of the external temperature difference $\Delta T_{ext}$=1° C., the processing unit 2-1 generates the command signal S_en having an appropriate value representative of an activation delay of the climatization plant equal to 30 minutes, i.e. the activation of the climatization plant is postponed by 30 minutes.

Similarly, the deactivation stair comprises four steps, each of which is composed of the following pairs of values:

first step: external temperature difference $\Delta T_{ext}$=2° C., activation instant advance=120';

second step: external temperature difference $\Delta T_{ext}$=1.5° C., activation instant advance=90';

third step: external temperature difference $\Delta T_{ext}$=1° C., activation instant advance=60';

fourth step: external temperature difference $\Delta T_{ext}$=0.5° C., activation instant advance=30'.

It can be observed that with the decrease in the value of the external temperature difference $\Delta T_{ext}$, the advance in the value of the activation instant of the climatization plant of the considered building also decreases.

Considering for example the third step of the deactivation stair, when the processing unit 2-1 of the weather-predictive apparatus 2 detects that the value of the external temperature difference $\Delta T_{ext}$=1° C., the processing unit 2-1 generates the command signal S_en having an appropriate value representative of an activation advance of the climatization plant equal to 60 minutes, i.e. the activation of the heating plant is anticipated by 60 minutes.

Note that the disclosure is not only applicable to the control of the activation/deactivation instants of a climatization plant of an industrial, public or domestic building, but also applies to other areas, such as:

in the agricultural field: control of the activation/deactivation instants of an irrigation system of a cultivated field or a system for controlling the temperature of a greenhouse;

in the sports field: control of the activation/deactivation instants of an irrigation system for a football pitch or golf course;

in the environmental field: control of the activation/deactivation instants of a management system of areas dependent on weather-climate conditions, such as urban gardens, green roofs, urban crops.

It should also be noted that the disclosure is not only applicable for controlling the activation/deactivation instants of a climatization plant, but more in general is also applicable within the operating interval of the climatization plant wherein it is such to carry out a by-pass of the thermostat or programmable thermostat already installed: in this case the system is configured to perform a modulation of the activation and deactivation of the climatization plant during the operating interval.

In other words, the forecast time interval value At can be much less than 24 hours, for example in the order of a minute.

A further embodiment of the present disclosure relates to a weather-predictive system 1 to control a climatization plant, the system comprising a weather-predictive apparatus 2, a weather forecast device 4, a telecommunications network 5 and a switch 7, wherein:

the weather-predictive apparatus comprises a sensor of weather-climate data associated with a building, a processing unit 2-1 and a signal transceiver 2-4, wherein:

the signal transceiver 2-4 is configured to transmit, to the weather forecast device through the telecommunications network, a current measured value of the weather-climate data associated with the building;

the signal transceiver 2-4 is configured to receive, from the weather forecast device through the telecommunications network, a plurality of predictive weather data associated with the building in a forecast time interval starting from the current instant;

the processing unit 2-1 of the weather-predictive apparatus is configured to:

calculate a modulation of the operation of the climatization plant of the building, as a function of the value of at least part of the plurality of the calculated received predictive weather data;

generate a command signal S_en having a value representative of said modulation of the operation of the climatization plant, wherein the command signal is representative of a value which closes or opens the switch 7 in order to supply the climatization plant or disconnect the supply to the climatization plant, respectively;

the weather forecast device 4 comprises a processing unit 4-1 and a signal transceiver 4-2;

the telecommunications network is configured to connect the weather-predictive apparatus 2 and the weather forecast device 4 to each other;

the switch 7 is configured to enable or disable an electric power supply to the climatization plant as a function of the command signal S_en; and wherein:

the signal transceiver 4-2 of the weather forecast device 4 is configured to receive the current measured value of the climate data associated with the building and to transmit the plurality of predictive weather data associated with the building in a forecast time interval starting from the current instant;

the processing unit 4-1 of the weather forecast device 4 is configured to calculate said plurality of predictive weather data associated with the building, as a function of the current measured value of the received weather-climate data associated with the building and as a function of weather forecasts associated with the building in the forecast time interval.

Said further embodiment of the disclosure also relates to a method for the weather-predictive control of a climatization plant, comprising the steps of:

a1) acquiring, at a weather-predictive apparatus 2, a current measured value of weather-climate data associated with a building;

b1) transmitting, from the weather-predictive apparatus 2 to the weather forecast device 4 through the telecommunications network 5, the measured value of the weather-climate data associated with the building;

c1) receiving, at the weather forecast device 4, the measured value of the weather-climate data associated with the building;

d1) calculating at the weather forecast device 4, as a function of the measured value of the received weather-climate data associated with the building and of weather forecasts associated with the building in a forecast time interval starting from the current instant, a plurality of predictive weather data associated with the building in at least part of said forecast time interval;

e1) transmitting, from the weather forecast device 4 to the weather-predictive apparatus 2 through the telecommunications network 5, the plurality of the calculated predictive weather data associated with the building in the forecast time interval;

f1) receiving, at the weather-predictive apparatus 2, the plurality of the calculated predictive weather data associated with the building;

g1) calculating, at the weather-predictive apparatus 2, a modulation of the operation of the climatization plant of the building, as a function of the value of at least part of the plurality of the calculated received predictive weather data;

h1) repeating at least one time the steps a1), b1), c1), d1), e1), f1) by calculating at least one further plurality of predictive weather data associated with the building in at least part of a further forecast time interval and re-calculating at least one further modulation of the operation of the climatization plant of the building.

The invention claimed is:

1. Weather-predictive apparatus for controlling a climatization plant, the apparatus comprising a sensor of weather-climate data associated with a building, a processing unit and a signal transceiver, wherein:

the signal transceiver is configured to transmit, to a weather forecast device through a telecommunications network, a current measured value of the weather-climate data associated with the building;

the signal transceiver is configured to receive, from the weather forecast device through the telecommunications network, a plurality of predictive weather data associated with the building in a forecast time interval starting from the current instant, wherein said plurality of predictive weather data are calculated as a function of the current measured value of the received weather-climate data associated with the building and as a function of weather forecasts associated with the building in the forecast time interval;

the processing unit is configured to:
calculate a change in a nominal instant of activation of the climatization plant of the building, as a function of the value of at least part of the plurality of the calculated received predictive weather data;
calculate a modified instant of activation as a function of the value of the nominal activation instant and of the value of said change in the nominal activation instant;
check whether the current instant is equal to the modified activation instant;
in case wherein the current instant is equal to the modified activation instant, generate a command signal having a value representative of the activation of the climatization plant;
in case wherein the current instant differs from the modified activation instant, repeat the calculation of the change in the nominal activation instant, the calculation of the modified activation instant and said check until the current instant is equal to a further modified activation instant, generating the command signal when the current instant is equal to the further modified activation instant.

2. Weather-predictive apparatus according to claim 1, wherein the processing unit is further configured to:
calculate a change in a nominal instant of deactivation of the climatization plant of the building, as a function of the value of at least part of the plurality of the calculated and received predictive weather data;
calculate a modified instant of deactivation as a function of the value of the nominal deactivation instant and of the value of said change in the nominal deactivation instant;
check whether the current instant is equal to the modified deactivation instant;
in case wherein the current instant is equal to the modified deactivation instant, generate a command signal having a value representative of the deactivation of the climatization plant;
in case wherein the current instant differs from the modified deactivation instant, repeat the calculation of the change in the nominal deactivation instant, the calculation of the modified deactivation instant and said check until the current instant is equal to a further modified deactivation instant, generating the command signal when the current instant is equal to the further modified deactivation instant.

3. Weather-predictive apparatus according to claim 2, wherein the processing unit is configured to calculate the change in the activation instant and the change in the deactivation instant by means of a double stair algorithm, wherein with the values of the current weather-climate data and of the plurality of the calculated predictive weather data being equal, said calculated change in the nominal activation instant differs from said calculated change in the nominal deactivation instant.

4. Weather-predictive apparatus according claim 1, wherein the processing unit is configured to:
calculate the change in the nominal activation instant as a function of a plurality of values of the predictive weather data associated with the building at instants preceding and subsequent to the nominal activation instant;
calculate the change in the nominal deactivation instant as a function of a plurality of values of the predictive weather data associated with the building at instants preceding and subsequent to the nominal deactivation instant.

5. Weather-predictive apparatus according to claim 1, wherein:
the current weather-climate data consist of the detected external temperature of the building;
the predictive weather data associated with the building consist of the forecasted external temperature of the building for a period having a value comprised between 10 minutes and 1 hour starting from the current instant for the forecast period having a value comprised between 24 hours and 48 hours.

6. Weather-predictive system to control a climatization plant, the weather-predictive system comprising:
the weather-predictive apparatus according to claim 1;
a weather forecast device comprising a processing unit and a signal transceiver;
a telecommunications network configured to connect the weather-predictive apparatus and the weather forecast device to each other;
a switch configured to enable or disable an electric power supply to the climatization plant as a function of a command signal; wherein:
the signal transceiver of the weather forecast device is configured to receive the current measured value of the climate data associated with the building and to transmit the plurality of predictive weather data associated with the building in a forecast time interval starting from the current instant;
the processing unit of the weather forecast device is configured to:
calculate said plurality of predictive weather data associated with the building, as a function of the current measured value of the received weather-climate data associated with the building and as a function of weather forecasts associated with the building in the forecast time interval;
recalculate, as a function of the actual measured value of the received weather-climate data associated with the building and of the weather forecasts associated with the building in at least one further forecast time interval, at least one respective further plurality of predictive weather data associated with the building in at least part of the at least one corresponding further forecast time interval;
the processing unit of the weather-predictive apparatus is further configured to:
recalculate at least one further change of the nominal instant of activation and at least one corresponding further value of the modified instant of activation, until the current instant is not equal to the further modified activation instant;
generate the command signal representative of a value for closing the switch so as to supply power to the climatization plant, when the current instant is equal to the modified activation instant;
generate the command signal representative of a value for opening the switch so as to interrupt the power supply to the climatization plant, when the current instant differs from the modified activation instant.

7. Weather-predictive system according to claim 6, wherein the processing unit of the weather-predictive apparatus is further configured to:
generate the command signal representative of a value for opening the switch so as to interrupt the power supply to the climatization plant, when the current instant is equal to the modified deactivation instant;
generate the command signal representative of a value for closing the switch so as to supply power to the climatization plant, when the current instant differs from the modified deactivation instant.

8. Method for the weather-predictive control of a climatization plant, comprising the steps of:
a) acquiring, at a weather-predictive apparatus, a current measured value of weather-climate data associated with a building;
b) transmitting, from the weather-predictive apparatus to a weather forecast device through a telecommunications network, the measured value of the weather-climate data associated with the building;
c) receiving, at the weather forecast device, the measured value of the weather-climate data associated with the building;
d) calculating at the weather forecast device, as a function of the measured value of the received weather-climate data associated with the building and of weather forecasts associated with the building in a forecast time interval starting from the current instant, a plurality of predictive weather data associated with the building in at least part of said forecast time interval;
e) transmitting, from the weather forecast device to the weather-predictive apparatus through the telecommunications network, the plurality of the calculated predictive weather data associated with the building in the forecast time interval;
f) receiving, at the weather-predictive apparatus, the plurality of the calculated predictive weather data associated with the building;
g) calculating, at the weather-predictive apparatus, a change in a nominal instant of activation of the climatization plant of the building, as a function of the value of at least part of the plurality of the calculated received predictive weather data;
h) calculating, at the weather-predictive apparatus, a modified instant of activation as a function of the value of the nominal activation instant and of the value of said change in the nominal activation instant;
i) checking whether the current instant is equal to the modified activation instant;
j) in case wherein the current instant is equal to the modified activation instant, activating the climatization plant;
k) in case wherein the current instant is not equal to the calculated activation instant, repeating steps a)-i) by calculating at least one further plurality of predictive weather data associated with the building in at least part of a further forecast time interval and re-calculating at least one further change in the nominal activation instant and a corresponding further value of the modified activation instant, until the current instant is equal to the further modified activation instant.

9. Control method according to claim 8, further comprising, after the steps a)-f), the steps of:
g1) calculating, at the weather-predictive apparatus, a change in a nominal instant of deactivation of the climatization plant of the building, as a function of the value of at least part of the plurality of the calculated received predictive weather data;
h1) calculating, at the weather-predictive apparatus, a modified instant of deactivation as a function of the value of the nominal deactivation instant and of the value of said change in the nominal deactivation instant;
i1) checking whether the current instant is equal to the modified deactivation instant;
j1) in case wherein the current instant is equal to the modified deactivation instant, deactivating the climatization plant;
k1) in case wherein the current instant is not equal to the modified deactivation instant, repeating steps a)-i1) by calculating at least one further plurality of predictive weather data associated with the building in at least part of a further forecast time interval and recalculating at least one further change in the nominal deactivation instant and a corresponding further value of the modified deactivation instant, until the current instant is equal to the further modified deactivation instant.

* * * * *